Aug. 17, 1943.   L. R. TWYMAN   2,327,293
SEALING MEANS
Filed March 8, 1941
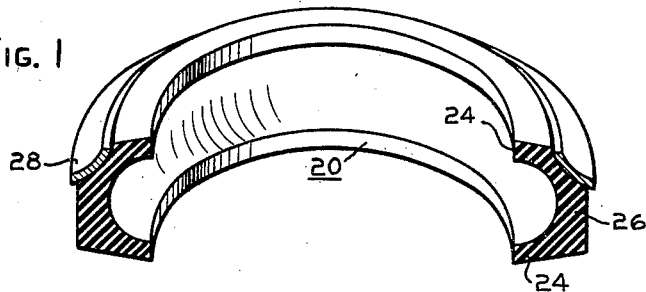
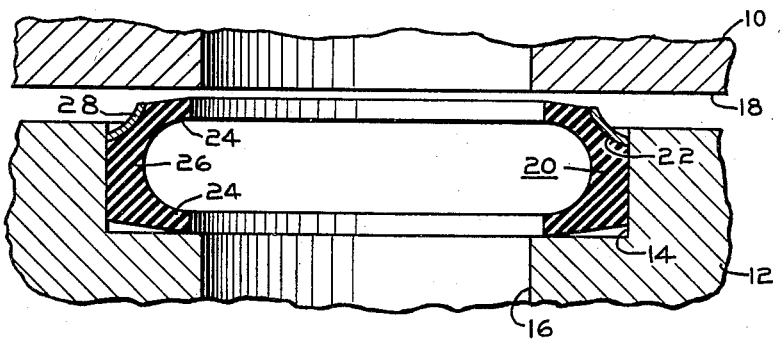
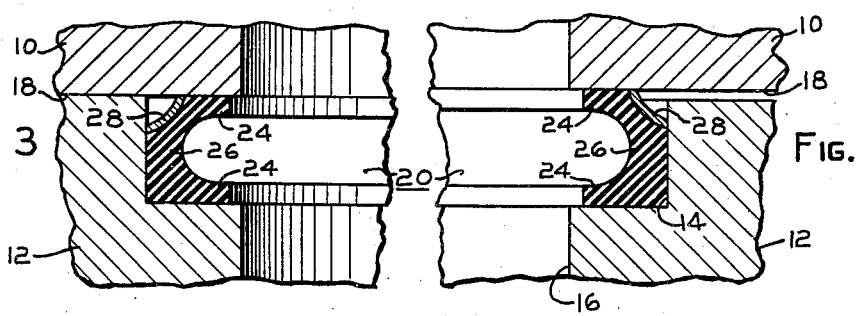
INVENTOR
L. RAYMOND TWYMAN
BY
ATTORNEY Patented Aug. 17, 1943

2,327,293

UNITED STATES PATENT OFFICE 2,327,293

SEALING MEANS

L. Raymond Twyman, Bloomfield Township, Oakland County, Mich., assignor to Vickers Incorporated, Detroit, Mich., a corporation of Michigan Application March 8, 1941, Serial No. 382,287

2 Claims. (Cl. 288—24)

This invention relates to power transmissions, particularly to those of the type comprising two or more fluid pressure energy translating devices, one of which may function as a pump and another as a fluid motor.

The invention is more particularly concerned with a sealing ring for use in conduit joints used in such transmissions.

In the patent to Joseph A. Martin, No. 2,204,507, there is disclosed a sealing ring formed of semi-hard neoprene and adapted to be positioned in an annular recess surrounding a conduit at the juncture between two separable members. Rings of this character have been very successful in eliminating the many small drips and seepages previously encountered at conduit joints in hydraulic power transmission systems. Such rings have been found to hold a tight seal without the slightest drip or seepage under conditions where previously used constructions would leak badly. As a result of this, some users of these sealing rings have overworked their capabilities and have attempted to use them under such severe conditions as to materially shorten their useful life. For example, the matter of rigidity and resistance to warpage or other separation of the two main members of the conduit joint requires far less attention with such sealing rings than with prior constructions. They will hold their seal even though the crack between the two joint members should open up as much as fifteen or twenty thousandths of an inch under warping stresses. Some users, however, have attempted to apply the rings in joints where, due to improper design of the parts, the crack will open up to a greater distance and thus permit the material of the sealing ring to begin to flow through the crack when it is opened under high pressure forces.

For some purposes it is occasionally desirable to utilize a sealing ring of softer material than is usually used and which has a tendency to flow outwardly or extrude through the crack, even though the design of the joint parts be very heavy so that the crack does not open up very wide under warping stresses. With softer or more flowable materials of this nature it is therefore desirable to prevent any possibility of such extrusion into the crack.

It is an object of the present invention to provide an improved sealing ring in which the possibility of flow of the neoprene or similar material through the crack is prevented even though the crack be opened to a distance many times that which would permit flow with the ring of the Martin patent.

A further object is to provide in connection with a ring of this character a confining ring of sheet metal which is shaped to bridge the crack between the two members and which contacts the walls of the recess on each member in such a way that fluid pressure will maintain such contact more tightly as it builds up.

It is also an object of the invention to provide an improved conduit joint wherein flow or extrusion of the sealing ring into the crack between the two joint halves is absolutely prevented, even though the sealing ring be made of the very soft or flowable material.

Further objects and advantages of the present invention will be apparent from the following description, reference being had to the accompanying drawing wherein a preferred form of the present invention is clearly shown.

In the drawing:

Figure 1 is a perspective view partly in section of a complete sealing ring embodying a preferred form of the present invention and illustrating the condition of the ring parts before growth takes place.

Figure 2 is a cross section of a conduit joint showing the sealing ring after growth has taken place and before the joint is completely assembled.

Figure 3 is a view corresponding to the left half of Figure 2 showing the joint in assembled relationship when not subjected to pressure.

Figure 4 is a view corresponding to the right half of Figure 2 showing the joint in assembled relationship and subjected to pressure.

Referring now to the drawing, there is shown in Figure 2 a portion of a conduit joint which may be similar to that illustrated in the Martin patent above mentioned comprising the two joint halves 10 and 12. The latter has an annular recess 14 surrounding the conduit 16 and a face 18 along which the two halves abut one another.

Positioned in the recess 14 is a sealing ring 20 of similar shape to that illustrated in the Martin patent aforesaid with the exception that the upper corner is scalloped out as indicated at 22. The ring in its unflexed condition before assembly of the joint halves is provided with outwardly flaring flexible lip portions 24 which are joined by the back portion 26. The ring 20 may be formed of neoprene or a similar synthetic or natural rubber-like material and preferably with a durometer hardness in the range of 65 to 85, although softer material may be equally satisfactorily used.

The ring 20 when molded is made smaller than the recess 14 and is grown to size by submersing it in oil for a sufficient length of time for substantially its full growth to take place.

An auxiliary confining ring 28 of sheet metal is provided to fit the cut-out portion 22 after the ring 20 has been grown to size. The confining ring 28 is shaped as a portion of a torus, that is, a segment thereof taken on the minor circle of the torus. The upper edge and the outer edge of the ring 28 are preferably finished accurately to lie parallel with the surfaces with which they contact when in the positions shown in Figures 3 and 4.

When the sealing ring has been assembled in the conduit joint, as shown in Figure 2, the two halves 10 and 12 may be drawn together by suitable bolts or other fastening means, not shown, and the sealing ring will take the form shown in Figure 3. It will be noted that the lips 24 are tightly maintained in contact at their very inner corners with the flat surfaces at the bottom of the recess 14 and at the bottom of the member 10. Fluid pressure applied to the sealing ring tends to tighten this contact and absolutely prevent the flow of oil even in the minutest quantities through the crack at the surface 18.

Should the joint halves and their fastening means be of such character that a relatively large crack opens up at the surface 18 when pressure is applied to the conduit, the ring follows this movement, as illustrated in Figure 4. Since the rubber-like material of the ring 20, when confined under pressure, acts much as a fluid, the reinforcing ring 28 is forced upwardly to follow the movements of the member 10. This action is further insured by reason of the fact that the expanding pressure applied to the inner convex surface of the ring 28 acts with a net force pushing upwardly and outwardly at approximately forty-five degrees to the vertical or horizontal. The horizontal outwardly pushing component of this force is resisted, however, by the natural resistance of the ring 28 to circumferential expansion. The upward vertical component, however, is unresisted since the member 10 moves upwardly under the application of pressure. Thus, it follows that the ring 28 must remain in contact with the flat surface 18 and must therefore follow the movements of the member 10 up and down under the application and release of pressure forces.

Thus, the confining ring 28 is maintained in tight contact both with the cylindrical wall of the recess 14 and with the flat surface 18 of the member 10. In this way the flow of the material of ring 20 cannot occur because there is no opening through which such flow can take place even though the crack between the two members open up to a very large opening.

While the form of embodiment of the invention as herein disclosed constitutes a preferred form, it is to be understood that other forms might be adopted, all coming within the scope of the claims which follow.

What is claimed is as follows:

1. A sealing ring for sealing a circular crack between two members confining a fluid and providing an annular recess adjacent the crack, said ring comprising a body of material having the resilient characteristics of rubber and shaped to provide when unstressed before assembly a generally U-shaped cross section including a pair of divergently flared flexible lips forming the legs of the U and joined by a backing portion adapted to seat in the recess, and a confiing ring of sheet metal in the shape of a torus truncated to a segment of the minor circle thereof, said metal ring being positioned in the recess and briding the crack by a substantial distance into the recess along the surface of each member whereby the sealing ring is prevented from entering the crack when the latter is opened a substantial distance under the force of fluid pressure.

2. A sealing ring for sealing a circular crack between two members confining a fluid and providing an annular recess adjacent the crack, said ring comprising a body of material having the resilient characteristics of rubber and shaped to provide when unstressed before assembly a generally U-shaped cross section including a pair of divergently flared flexible lips forming the legs of the U and joined by a backing portion adapted to seat in the recess, and a confining ring of sheet metal shaped to bridge the crack for a substantial distance on either side thereof and engaging a wall of the recess on each member with an abutting contact which is tightened by the application of fluid pressure and independent of opening of said crack.

L. RAYMOND TWYMAN.